Sept. 11, 1962 A. KALLEL 3,052,944
HOSE CLAMP
Filed Aug. 8, 1958
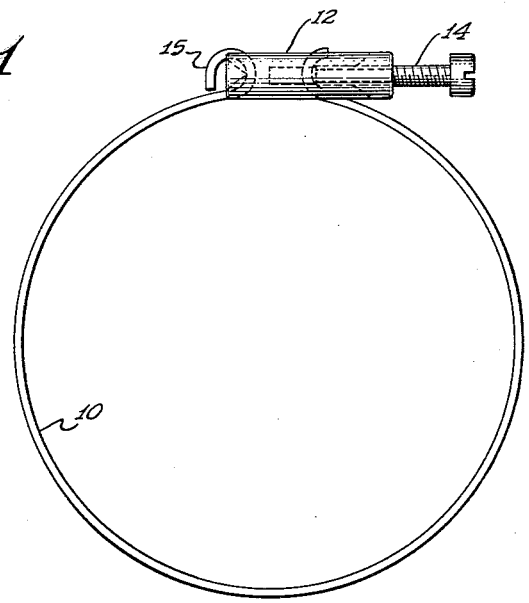
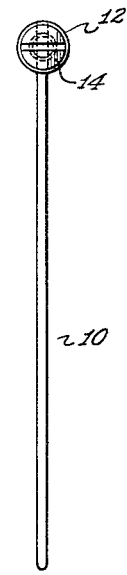
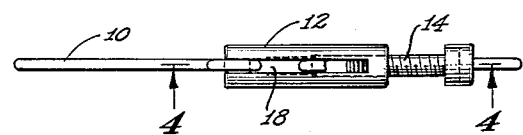
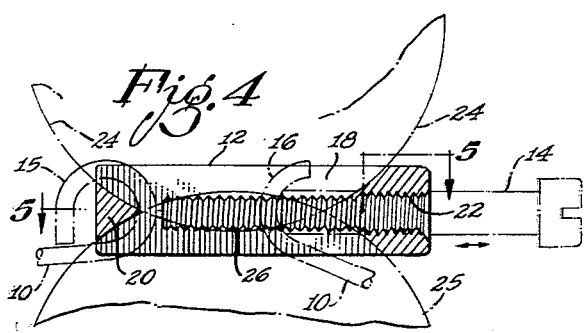
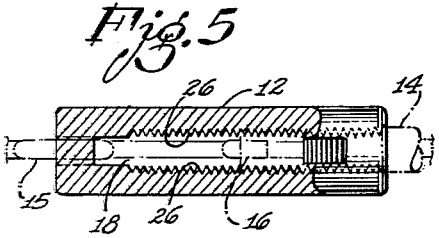
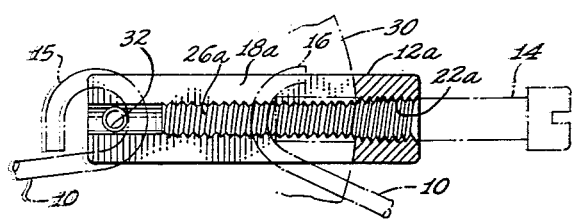
INVENTOR:
Allen Kallel
By Smyth & Roston
Attorneys

United States Patent Office 3,052,944
Patented Sept. 11, 1962

3,052,944
HOSE CLAMP
Allen Kallel, Los Angeles, Calif., assignor to Wemac Company, Inglewood, Calif., a corporation of California
Filed Aug. 8, 1958, Ser. No. 754,074
2 Claims. (Cl. 24—283)

This invention relates to a hose clamp and, more particularly, relates to a hose clamp for low pressure installations.

While the invention is widely applicable for its purpose, it has been initially embodied in a hose clamp for use in the construction of an air conditioning system for an aircraft. This initial embodiment of the invention is selected for the present disclosure and will provide adequate guidance for those skilled in the art who may have occasion to apply the underlying principles of the invention to other specific purposes.

The air conditioning system of an aircraft operates at a low pressure of less than 1 p.s.i. A typical pressure is 5 inches of water. A surprisingly large number of hose clamps is required on an aircraft such as a Douglas DC-8 airplane and the numerous hose clamps must be installed at locations where clearance space is extremely limited.

One problem to which the invention is directed is to provide a hose clamp for this purpose of simple and inexpensive construction to minimize the material cost involved. Another problem is to provide such a hose clamp that may be installed easily and quickly in cramped quarters to minimize the labor costs involved. Another problem is to provide a hose clamp of extremely light weight. Weight saving is of such importance in aircraft construction that a great deal of trouble is taken to save a single pound. The present invention actually affords a total weight reduction of approximately 50 pounds in the construction of a Douglas DC-8.

The invention solves these three problems by employing a slender wire-like member with spaced ends to encircle the air conditioning hose. Combined with this wire-like encircling member is a slotted light-weight connector or connecting member equipped with a longitudinal screw to draw the spaced ends together. One end of the encircling member is connected directly to this connector and the other end extends into the slot of the connector and is bent for engagement by the inner end of the screw to be forced thereby along the slot.

The first end of the wire-like encircling member may be directly attached to the connector in any suitable manner. For example, the end of the wire-like member may be formed into an eye or loop and the loop may be engaged by a transverse pin that is suitably mounted in the connector transversely thereof. A feature of the preferred practice of the invention, however, is the concept of slotting the connector in such a manner as to form an integral transverse end portion to receive and engage the loop of the wire-like member. The wire-like member may be made of any suitable material for stress in tension, the material being selected to resist corrosion and oxidation.

In the preferred practice of the invention, wherein the two ends of the wire-like member are formed to cooperate with the connector and the tightening screw, a further requirement is that the wire-like material have the rigidity required for the two formed ends to keep their shapes. In this regard, a feature of the preferred practice of the invention is the use for this purpose of stainless steel wire of relatively small diameter, for example, a diameter on the order of 1/20 of an inch. The use of stainless steel satisfies the requirement for resistance to corrosion and oxidation. The small diameter makes the encircling wire relatively light-weight and, fortuitously, stainless steel wire of such small diameter is inherently work hardened to afford the required degree of rigidity at the formed ends of the wire.

The various features and advantages of the invention may be understood from the following description together with the accompanying drawings.

In the drawing, which is to be regarded as merely illustrative:

FIGURE 1 is a side elevation of a preferred embodiment of the hose clamp;
FIGURE 2 is an edge-view of the same hose clamp;
FIGURE 3 is a plan view of the same hose clamp;
FIGURE 4 is an enlarged fragmentary section taken as indicated by the line 4—4 of FIGURE 3 and showing the construction of the connector. The view shows how one end of the wire-like member is permanently attached to the connector and the other end is engaged by the screw of the connector in an adjustable manner;
FIGURE 5 is a similar fragmentary sectional view of the connector taken as indicated by the angular line 5—5 of FIGURE 4; and
FIGURE 6 is a fragmentary sectional view similar to FIGURE 5 illustrating a modification of the connector.

The principal parts of the presently preferred embodiment of the invention shown in FIGURES 1 to 5 comprise a wire-like member 10 to encircle the hose, a connector 12 associated with the two ends of the wire-like member, and a screw 14 mounted in the connector longitudinally thereof to draw the wire-like member tight around the hose. As heretofore indicated the encircling member 10 may comprise a stainless steel wire of a diameter on the order of 1/20 of an inch. One end of the wire 10 is permanently connected to the connector 12 and preferably is connected to the connector in a pivotal manner. For this purpose, this first end of the wire 10 is formed into an eye or loop 15. The second end of the wire 10 is adapted for cooperation with the inner end of the screw 14 and for this purpose may be shaped to provide a terminal hook 16 to receive the end of the screw.

In the construction shown, the connector 12 comprises an elongated aluminum body of cylindrical configuration which is formed with a longitudinal slot 18. The hook 16 on the second end of the wire 10 extends into the slot 18 in a slidable manner and the screw 14 is aligned longitudinally with the slot to engage the terminal hook 16 to force the second end of the wire along the axis of the connector.

The loop 15 at the first end of the stainless steel wire 10 may be engaged with the connector 12 in any suitable manner. A feature of this first embodiment of the invention is that the slot 18 is cut in the connector member 12 in such manner as to provide a transverse portion 20 of the connector at the end of the connector for engagement by the loop 15.

In the preferred procedure for fabricating the connector 12, the cylindrical aluminum body is first bored and tapped axially from one end to provide a threaded bore 22 to receive the screw 14. Then a milling cutter is applied to the aluminum body from opposite sides to form the longitudinal slot 18. The circumferential dimension of the milling cutter is indicated by the two dotted-line arcs 24 and 25 in FIGURE 4, the arc 24 representing the final depth of penetration of the milling cutter from one side of the aluminum body and the arc 25 representing the final depth of penetration of the milling cutter from the other side. It is apparent that each end of the slot 18 has inner transverse surfaces conforming to the curvature of the pair of intersecting circles 24 and 25. It can be seen in FIGURE 4 that these two cuts form the transverse end portion 20 which is encircled in a pivotal manner by the loop 15 on the first end of the stainless steel wire.

The cutting of the aluminum body of the connector member in this manner forms a slot 18 with parallel side walls and the slot is somewhat narrower than the diameter of the threaded bore 22 with the result that each of the side walls of the slot is formed with a shallow longitudinal recess 26. As may be seen in FIGURE 4, each recess 26 has fragments of the original screw thread of the bore 22 and provides clearance for adequate longitudinal advance of the screw 14.

The manner in which the described hose clamp serves its purpose may be readily seen from the foregoing description. The hose clamp may be packed, shipped and handled in the state indicated in FIGURES 1, 2 and 3 with the terminal hook 16 of the wire 10 extending into the slot 18 of the connector 12. To install the hose clamp, the operator simply removes the terminal hook 16 of the stainless steel wire 10 from the slot 18 of the connector 12 and then spreads apart the two ends of the wire to permit the wire to encircle the hose at the desired position. The pivotal connection between the first end of the wire 10 and the connector 12 makes it possible to swing the connector out of the way to facilitate the maneuvering of the wire into the desired position of encirclement but it is not at all necessary that the wire be pivotally connected to the connector.

With the wire 10 encircling the hose at the desired position, the terminal hook 16 of the wire is maneuvered into the slot 18 with the screw 14 retracted to make the full length of the slot accessible. It is then a simple matter to take the final step of applying a screw driver to advance the screw 14 longitudinally thereby to move the terminal hook 16 at one end of the wire towards the loop 15 at the other end of the wire to contract the wire to embrace the hose with the desired tension. This tightening action tends to straighten out the two ends of the wire that form the loop 15 and the hook 16 but, as heretofore stated, the stainless steel wire by virtue of its being work hardened is sufficiently rigid to withstand any tendency of the contracting force to straighten out the two ends of the wire.

FIGURE 6 shows a connector member 12a which is of the same general character as the first described connector member 12. In this instance, the cylindrical aluminum body of the connector 12a is slotted by means of a milling cutter that is advanced into one end of the body. The circumferential configuration of the milling cutter is indicated by the dotted-line arc 30 in FIGURE 6 and this arc also indicates the depth of penetration of the milling cutter. Here again the milling cutter is of less thickness than the diameter of the threaded bore 22a with the consequence that each side wall of the slot is left with a longitudinal recess 26a which has fragments of the screw thread and provides adequate clearance of the advance of the screw 14. Finally, a transverse pin 32 is mounted in the aluminum body diametrically thereof and extending across the slot 18a perpendicularly thereof for engagement by the previously mentioned loop 15 on the first end of the encircling wire 10.

My description in specific detail of the selected practice of the invention will suggest various changes, substitutions and other departures from my disclosure within the spirit and scope of the appended claims.

I claim:

1. A weight-saving hose clamp for a hose of a given circumference in an aircraft air conditioning system or the like, comprising: a single resilient wire of generally circular configuration having first and second ends, said wire being of substantially less circumferential extent than said circumference to provide a substantial circumferential gap between the ends when the wire encircles said hose; a connector member pivotally connected at one end to said first end of the wire, said connector member being an elongated body with a threaded axial bore extending therein from the second end of the connector member, said threaded bore being of substantially larger diameter than the wire, said connector member having a longitudinal slot therethrough in axial alignment with the bore and positioned diametrically of the bore to receive said second end of the wire, said slot being slightly wider than the diameter of the wire but narrower than the diameter of the bore, said slot being enlarged on both sides in axial alignment with the bore, the enlarged portion of the slot being formed with fragmentary turns of a screw thread, said second end of the wire being bent to a curve, said wire being sufficiently stiff for the bent end of the wire to substantially maintain its bent configuration under a force to tighten the wire around the hose; and a screw threaded into said bore and extending into said slot into engagement with said fragmentary turns and into abutment with the inner radius of the bent end of the wire to force the bent end of the wire towards the first end of the wire for circumferential tightening of the wire around the hose.

2. A combination as set forth in claim 1 in which each end of said slot has inner transverse surfaces conforming to the curvature of a pair of equal intersecting circles, the centers of said circles being on opposite sides of the slot in the plane of the slot whereby the slot may be formed by a milling cutter, of the diameter of the intersecting circles.

References Cited in the file of this patent

UNITED STATES PATENTS

| 639,342 | Belmont | Dec. 19, 1899 |
|---|---|---|
| 685,014 | Thresher | Oct. 22, 1901 |
| 2,417,741 | Dillon | Mar. 18, 1947 |

FOREIGN PATENTS

| 196,420 | Great Britain | Apr. 26, 1923 |